United States Patent [19]

Lang

[11] Patent Number: 5,793,530
[45] Date of Patent: Aug. 11, 1998

[54] VEHICLE EXTERNAL REAR-VIEW MIRROR ASSEMBLY AND METHOD FOR MANUFACTURING SAME

[75] Inventor: Heinrich Lang, Ergersheim, Germany

[73] Assignee: Mekra Lang GmbH & Co. KG, Furth, Germany

[21] Appl. No.: 694,994

[22] Filed: Aug. 9, 1996

[30] Foreign Application Priority Data

Aug. 12, 1995 [DE] Germany .................. 195 29 827.6
Jun. 4, 1996 [DE] Germany .................. 196 22 369.5

[51] Int. Cl.$^6$ .............................. G02B 7/182; G02B 5/08
[52] U.S. Cl. ................... 359/514; 359/507; 359/884
[58] Field of Search ............................. 359/507, 509, 359/512–514, 871, 883, 884, 900

[56] References Cited

U.S. PATENT DOCUMENTS

| | | | |
|---|---|---|---|
| 3,656,830 | 4/1972 | Kurschner | 359/514 |
| 4,232,979 | 11/1980 | Johnson, Jr. et al. | 359/507 |
| 5,160,780 | 11/1992 | Ono et al. | 359/871 |
| 5,173,804 | 12/1992 | Dogey | 359/883 |
| 5,198,929 | 3/1993 | Clough | 359/513 |
| 5,247,395 | 9/1993 | Martinez | 359/883 |

FOREIGN PATENT DOCUMENTS

| | | |
|---|---|---|
| 6808811 | 11/1968 | Germany . |
| 81254520 | 5/1981 | Germany . |
| 82084424 | 8/1982 | Germany . |
| 85233285 | 8/1987 | Germany . |
| 4302950A1 | 8/1994 | Germany . |
| 955958 | 4/1964 | United Kingdom ......... 359/514 |

OTHER PUBLICATIONS

English translation of Germany Pub. No. 82 08 442.4.
Translation of claim 1 of German Patent No. 81 25 452.0.
Translation of claim 1 of German Patent No. 85 23 328.5.
Translation of claim 1 of German Patent No. 6808811.
Translation of claim 1 of German Patent No. 82 08 442.4.
"MEKRA" Brochure, MEKRA Rangau Plastics GmbH & I Co. KG, pp. 1–3 and 15–57, Undated.

*Primary Examiner*—Thong Nguyen
*Attorney, Agent, or Firm*—Dority & Manning, P.A.

[57] ABSTRACT

A vehicle mirror assembly includes a mirror glass, a mirror support plate, and a moistureproof adhesive disposed circumferentially around the mirror glass between at least a portion of the outside edge of the mirror glass and the mirror support plate to secure the mirror glass to the mirror support plate and to preclude moisture from outside the assembly from contacting the portion of the outside edge of the mirror glass. The adhesive may be a high viscosity adhesive, with a low viscosity adhesive being disposed between the mirror glass and the mirror plate and substantially surrounded by the high viscosity adhesive. Corresponding methods for manufacturing such vehicle mirror assemblies are also included.

24 Claims, 1 Drawing Sheet

5,793,530

VEHICLE EXTERNAL REAR-VIEW MIRROR ASSEMBLY AND METHOD FOR MANUFACTURING SAME

BACKGROUND OF THE INVENTION

1. Field of the Invention

The invention relates to a mirror arrangement for external rear-view mirror for motor vehicles, in particular for utility vehicles, including a mirror glass, in particular with a mirror coating and protecting-lacquer coating on the rear, as well as a mirror support plate, to which the mirror glass is durably fixed by gluing and an encircling rim of which laterally encloses the edge of the mirror glass.

2. Background Art

Mirror arrangements come in lots of designs. As a rule, the gluing between the mirror glass and the mirror support plate is effected by double sided bonding sheet that is cut to correspond to the shape of the mirror glass. If the mirror support plate is provided with openings for electric terminals to pass through for a heating foil attached to the rear of the mirror glass, the bonding sheet includes corresponding cut-outs.

The use of bonding sheet for durably fixing the mirror glass on the mirror support plate has various disadvantages:

Fundamentally, bonding sheet is comparatively expensive, it being necessary to have the sheet ready-made to match the respective mirror shape. Another aspect that contributes to the rise in cost is the need for bonding-sheet-coated silicone paper, on which bonding sheet is supplied by the manufacturer.

The silicone paper is waste that must be discarded.

If the mirror glass is fixed to the mirror support plate by the bonding sheet, the lateral edges of the mirror glass remain bare. If no special measures are taken, this is where the mirror coating, which is underneath the protecting-lacquer coating, is open for corrosion by moisture that penetrates between the edge of the mirror glass and the encircling rim of the mirror support plate. As a remedy, prior art teaches to continue the protecting-lacquer coating from the rear of the mirror glass as far as into the vicinity of the latter's edge. This kind of sealing is a complicated step in the manufacture of the mirror glass, considerably increasing the production cost.

OBJECTS AND SUMMARY OF THE INVENTION

It is a principal object of the invention to improve the gluing together of the mirror glass and the mirror support plate.

According to the invention, this object and others are attained in that the gluing is formed by at least one strand of permanently flexible, moistureproof adhesive, which is inserted in the corner portion, formed by the rim, of the mirror support plate and all around entirely seals the edge of the mirror glass. This creates a moistureproof connection between the mirror glass and the support plate which is moreover easy to produce and precludes any corrosion problems.

In accordance with a preferred embodiment of the mirror arrangement, in a mirror glass equipped with a mirror and protecting-lacquer coating on the rear, the adhesive strand is placed in such a way that the edge of the mirror glass is entirely sealed all around the portion where the mirror coating is bare. This helps attain sealing of the edge by the adhesive, simultaneously providing for permanent fixing of the mirror glass to the mirror support plate.

In this case, the gluing according to the invention has the advantage of double function. The gluing according to the invention provides the further advantage that there is no waste, owing to the omission of bonding sheet and the accompanying silicone paper. Also, the application of a strand of adhesive can be made automatic, requiring machinery that is by far less complicated than that for bonding sheet, which, for application, must first be removed from the silicone paper, after which it has to be positioned accurately. Thus, the gluing according to the invention helps render feasible a production that is by far less complicated and accompanied with reduced production cost, the properties in use of the mirror arrangement simultaneously being improved. For instance, the durability of the gluing connection is improved by the use of permanently flexible and thus equalizing adhesive.

As regards the selection of this adhesive, preferred measures are provided within the scope of the invention, aiming at adjusting the viscosity to the respective place of use of the adhesive. For instance, the adhesive strand, which is inserted in the corner portion of the mirror support plate and which ensures the sealing of the edge of the mirror glass, is adjusted to be highly viscous when applied so as to ensure accurate localization of the material and prevent it from being squeezed out. Corresponding material that could be called "tough," "pasty" or "stable" is preferably used also for the sealing of openings in the mirror support plate.

As opposed to this, the adhesive, which is spread on the front side of the mirror support plate as a single strand or a plurality of strands and, for reasons of safety, provides for adhesion of the mirror glass with the mirror support plate over their full surfaces, is a low-viscous glue virtually "self-levelling" or fluid. This selection of material ensures the adhesive to disperse more easily and spread uniformly in the gap between the mirror glass and the support plate. The viscosity of the adhesive preferably ranges from 20 to 35 Pas. The adhesive layer thus produced serves for protection against moisture and corrosion and for instance prevents splash water from penetrating between the mirror glass and the support plate. This prevents the mirror glass from being forced off during a freeze. Should the mirror glass break to pieces, as is the case in a relevant safety test denoted as the "pendulum impact test," the adhesive layer further ensures that the individual pieces of the mirror glass reliably to stick to the mirror support plate. During the spreading of the low-viscosity adhesive, the highly viscous strands disposed on the edges of the mirror glass or on the edges of the latter's openings advantageously work as a sort of a seal or "dam," effectively preventing the low-viscosity material from being squeezed out.

Additional objects and advantages of the invention will be set forth in part in the following description, or may be obvious from the description, or may be learned from practice of the invention. Further features, details and advantages of the invention will become apparent from the claims and the ensuing description of an exemplary embodiment of the invention, in combination with the drawings.

DESCRIPTION OF THE PREFERRED EMBODIMENTS

Figure 1:
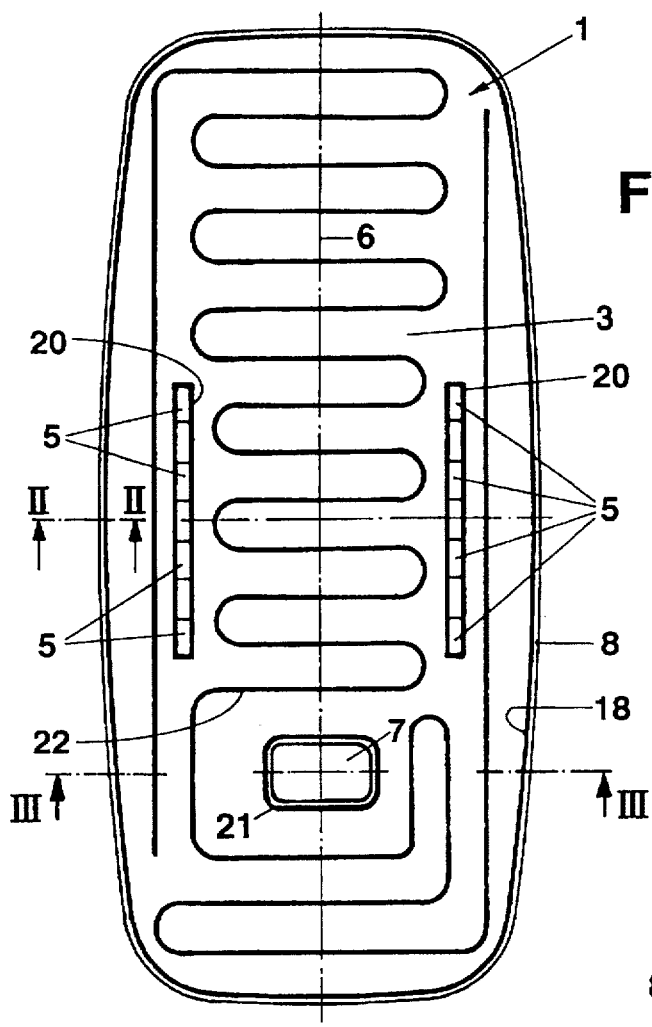
FIG. 1 is a plan view of a mirror support plate with adhesive strands applied to it, and without the mirror glass.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield yet another embodiment. It is intended that the present invention include such modifications and variations.

As seen in FIG. 1, a mirror arrangement according to the invention includes a mirror support plate 1, the contour of which corresponds to the shape of the mirror glass 2 (FIG. 2) placed thereon. The mirror support plate 1 has a plate-type main body 3, which corresponds to the curvature of the mirror glass 2 and on the rear 4 of which retaining projections (not shown) are integrally formed for the mirror support plate 1 to be slipped on a motor-adjusted pivot bearing arrangement. In this regard, the mirror support plate 1 of FIG. 1 corresponds to the type according to DE 43 02 950 A1 (corresponding to U.S. patent application Ser. No. 08/245,952, issued as U.S. Pat. No. 5,615,054). For these retaining projections to be formed, the main body has two rows of openings 5, rectangular in a plan view, on the left and on the right of the long center line 6 of the mirror support plate 1.

On the center line 6, the lower half of the main body 3 of the mirror support plate 1 exhibits a larger rectangular opening 7, through which the terminal lugs of an electric heating foil (not shown in this example of embodiment) may pass.

Figure 2:
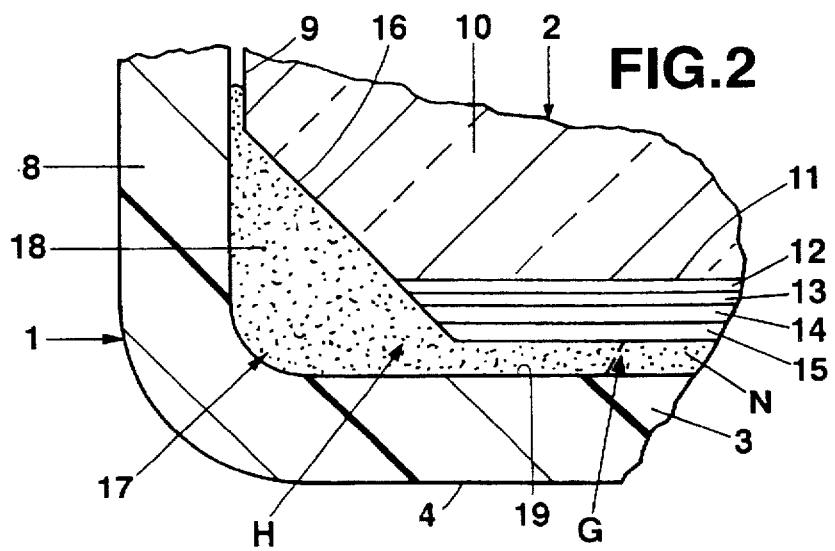
FIG. 2 is a partial section view of a portion of the mirror arrangement of FIG. 1, taken along line II—II.

As further seen in FIGS. 1 and 2, the mirror support plate 1 has an encircling rim 8 which laterally encloses the edge 9 of the mirror glass 2.

The detailed structure of the mirror glass 2 can be seen in FIG. 2. It consists of a usual glass pane 10, the rear 11 of which is provided with a silver foiling 12, a copper foiling 13, a priming coat 14 and a layer of finish lacquer 15. In the vicinity of the edge 9, which includes a bevel 16, the silver foiling 12 and the copper foiling 13 are bare.

Figure 3:
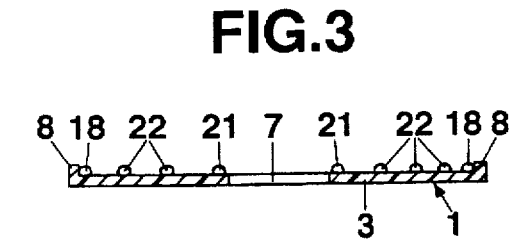
FIG. 3. is a section view of the mirror arrangement of FIG. 1, taken along line III—III.

In order for sealing to be attained for the protection of the silver and copper foilings 12 and 13 against corrosion by penetrating moisture and, at the same time, for the mirror glass 2 to be durably mounted on the mirror support plate 1, an encircling strand 18 (FIGS. 1, 3) of silicone-based or polyurethane-based, permanently flexible and moistureproof adhesive is inserted in the corner portion 17 formed by the rim 8 of the mirror support plate 2 during the manufacture of the mirror arrangement shown. Afterward, the rear 11 of the mirror glass 2 is pressed onto the front side 19 of the mirror support plate 1. The strand 18 is squeezed and flattened, entirely sealing the edge 9 all around and, in particular, in the vicinity of the bevel 16, as a result of which no moisture can reach the bare silver and copper foiling 12, 13.

For the gap between the rear 11 of the mirror glass 2 and the front side 19 of the mirror support plate 1 to be sealed also in the vicinity of the openings 5, 7, strands 20, 21 are spread around these openings 5, 7 prior to the insertion of the mirror glass 2 to provide a sealing effect.

So as to increase the stability of the adhesion, another strand 22 is applied, which meanders on the front side 19 of the mirror support plate 1 and which ensures gluing connection with the mirror support plate 1 over the entire surface of the mirror glass 2. Squeezing and flattening the strands 20, 21, 22 helps achieve a connection between the mirror support plate 1 and the mirror glass 2 over their full surfaces, which provides for excellent protection against splintering. By reason of the permanent flexibility of the adhesive used, stresses that build up for instance because of different coefficients of thermal expansion of the mirror support plate 1 and the mirror glass 2 can be equalized.

In a viscous condition, all the adhesive strands 18, 20, 21, 22 can be spread on the mirror support plate 1 by means of a machine-operated applicator nozzle. The adhesive strand 18 inserted in the corner portion 17 of the mirror support plate 1 and the adhesive strands 20, 21 encircling the openings 5, 7 consist of highly viscous, i.e. tough, stable material.

The meandering adhesive strand 22 consists of low-viscous, self-levelling adhesive of a viscosity of for instance 30 Pas. The preferred viscosity ranges from 20 to 35 Pas, or from 20 to 30 Pas.

Because of this adjustment of the viscosity of the various adhesive strands 18, 20, 21 on the one hand and 22 on the other, the material of the highly viscous strands virtually forms a barrier preventing the low-viscous material of the strand 22 from escaping laterally. Thus, the strand 22 material spreads uniformly and full-face between the main body 3 of the mirror support plate 1 and the mirror glass 2. In FIG. 2, this is roughly outlined by a portion H of some highly viscous adhesive and a portion N of material of low viscosity, a diffuse parting line G (dash-dotted in FIG. 2) resulting between these two portions H, N of material.

It will be apparent to those skilled in the art that various modifications and variations can be made in the present invention without departing from the scope and spirt of the invention. It is intended that the present invention include such modifications and variations as come within the scope of the appended claims and their equivalents.

What is claimed is:

1. A vehicle mirror assembly comprising:
   a mirror glass including an outside edge;
   a mirror support plate for supporting the mirror glass;
   a high viscosity adhesive disposed circumferentially around the mirror glass and between at least a portion of the outside edge of the mirror glass and the mirror support plate; and
   a low viscosity adhesive disposed between the mirror glass and the mirror support plate and substantially surrounded by the high viscosity adhesive.

2. The vehicle mirror assembly of claim 1, wherein at least one of the adhesives includes polyurethane.

3. The vehicle mirror assembly of claim 1, wherein at least one of the adhesives includes silicone.

4. The vehicle mirror assembly of claim 1, wherein the mirror glass includes a pane of glass having an outer periphery, and at least one coating having an outer periphery, at least a part of the pane of glass outer periphery and all of the coating outer periphery being included within the portion of the outside edge of the mirror glass.

5. The vehicle mirror assembly of claim 4, wherein the outside edge of the mirror glass includes a bevel.

6. The vehicle mirror assembly of claim 5, wherein the bevel extends across at least a part of the pane of glass outer periphery and across all of the coating outer periphery.

7. The vehicle mirror assembly of claim 4, wherein the at least one coating includes at least one foil layer and at least one finish layer.

8. The vehicle mirror assembly of claim 1, wherein the mirror support plate includes a main body and a rim extending from the main body, the main body and the rim intersecting at a corner, the outside edge of the mirror glass substantially opposing the corner, and the high viscosity adhesive being disposed within the corner.

9. The vehicle mirror assembly of claim 1, wherein the mirror support plate defines at least one opening therethrough, a portion of the high viscosity adhesive being disposed circumferentially around the at least one opening between the mirror glass and the mirror support plate.

10. The vehicle mirror assembly of claim 1, wherein the high viscosity adhesive and the low viscosity adhesive contact each other.

11. The vehicle mirror assembly of claim 1, wherein the low viscosity adhesive has a viscosity of about 20 to 35 Pas.

12. The vehicle mirror assembly of claim 1, wherein the mirror glass includes a rear surface and the mirror support plate includes a front surface, the high viscosity adhesive and the low viscosity adhesive covering substantially all of rear surface and the front surface.

13. A method for manufacturing a vehicle mirror assembly comprising the steps of:
providing a mirror support plate;
applying a moistureproof high viscosity adhesive to the mirror support plate;
applying a moistureproof low viscosity adhesive to the mirror support plate substantially surrounded by the high viscosity adhesive;
providing a mirror glass including an outside edge; and
pressing the mirror glass onto the mirror support plate so that at least a portion of the outside edge circumferentially contacts the high viscosity adhesive to secure the mirror glass to the mirror support plate and to preclude moisture from outside the assembly from contacting the portion of the outside edge of the mirror glass.

14. The method of claim 13, wherein the mirror support plate includes a main body and a rim extending from the main body, the main body and the rim intersecting at a corner, the applying the moistureproof high viscosity adhesive step including applying the moistureproof high viscosity adhesive to the corner.

15. The method of claim 13, further comprising the steps of:
providing at least one opening through the mirror support plate; and
applying the moisture high viscosity adhesive around the opening before the pressing step.

16. The method of claim 15, wherein the at least one opening includes a plurality of openings, a portion of the moistureproof high viscosity adhesive being disposed around each of the openings between the mirror glass and the support plate.

17. The method of claim 13, wherein after the pressing step the moistureproof high and low viscosity adhesives contact each other.

18. The method of claim 13, wherein the moistureproof low viscosity adhesive has a viscosity of about 20 to 35 Pas.

19. The method of claim 13, wherein the moistureproof high viscosity adhesive includes silicone.

20. The method of claim 13, wherein the moistureproof high viscosity adhesive includes polyurethane.

21. The method of claim 13, wherein the mirror glass includes a pane of glass and at least one coating having an outer periphery, and the pressing step includes pressing the mirror glass onto the mirror support plate at least until the outer periphery of the coating is covered by the moistureproof high viscosity adhesive.

22. The method of claim 21, wherein the outside edge of the mirror glass includes a bevel.

23. The method of claim 22, wherein the bevel extends across at least a part of the pane of glass outer periphery and across all of the coating outer periphery.

24. The method of claim 21, wherein the at least one coating includes at least one foil layer and at least one finish layer.

* * * * *